Jan. 2, 1934.  J. TELLER ET AL  1,942,265
STRAIGHT LINE COOKING TOP RANGE OR STOVE
Filed Oct. 23, 1931  3 Sheets-Sheet 1
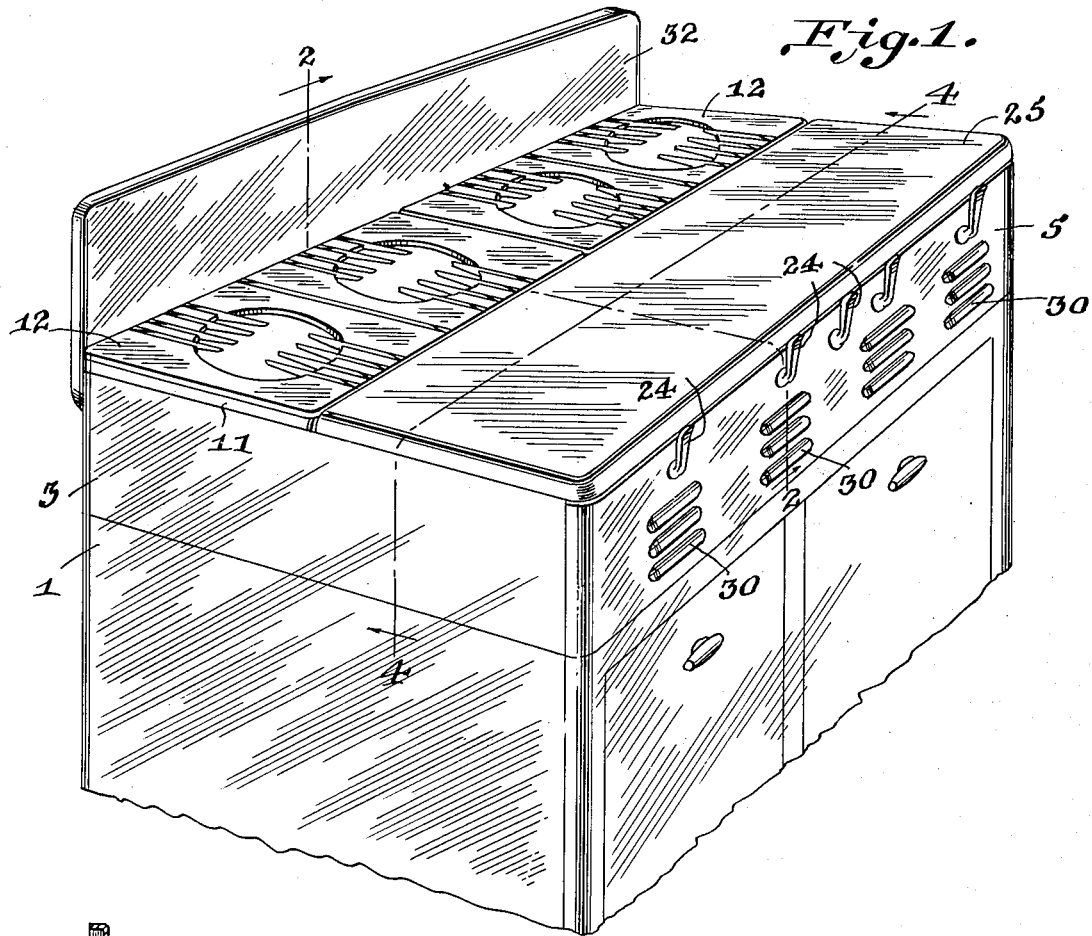
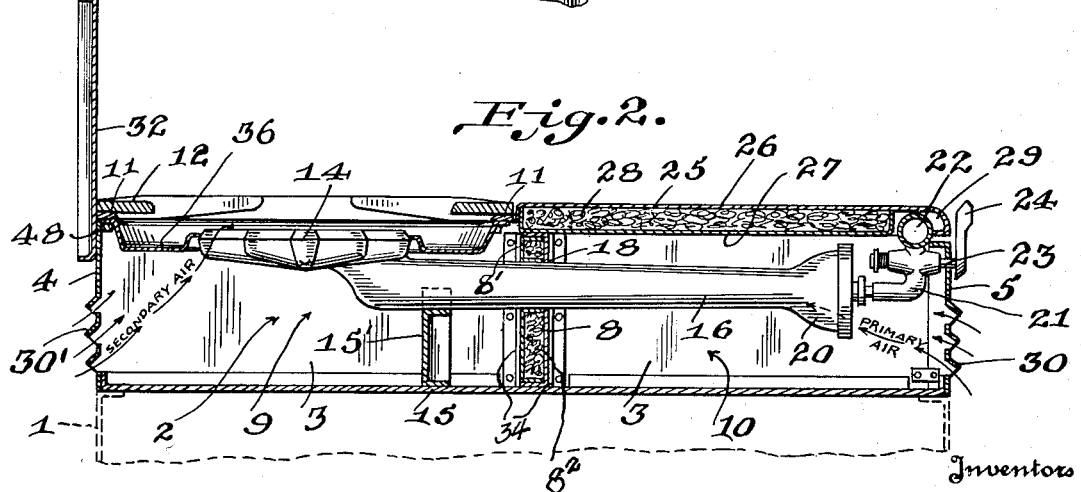
Inventors
Jacob Teller
AND Arthur P. Schulz
By E. E. Heath
Attorney Jan. 2, 1934. J. TELLER ET AL 1,942,265
STRAIGHT LINE COOKING TOP RANGE OR STOVE
Filed Oct. 23, 1931 3 Sheets-Sheet 2
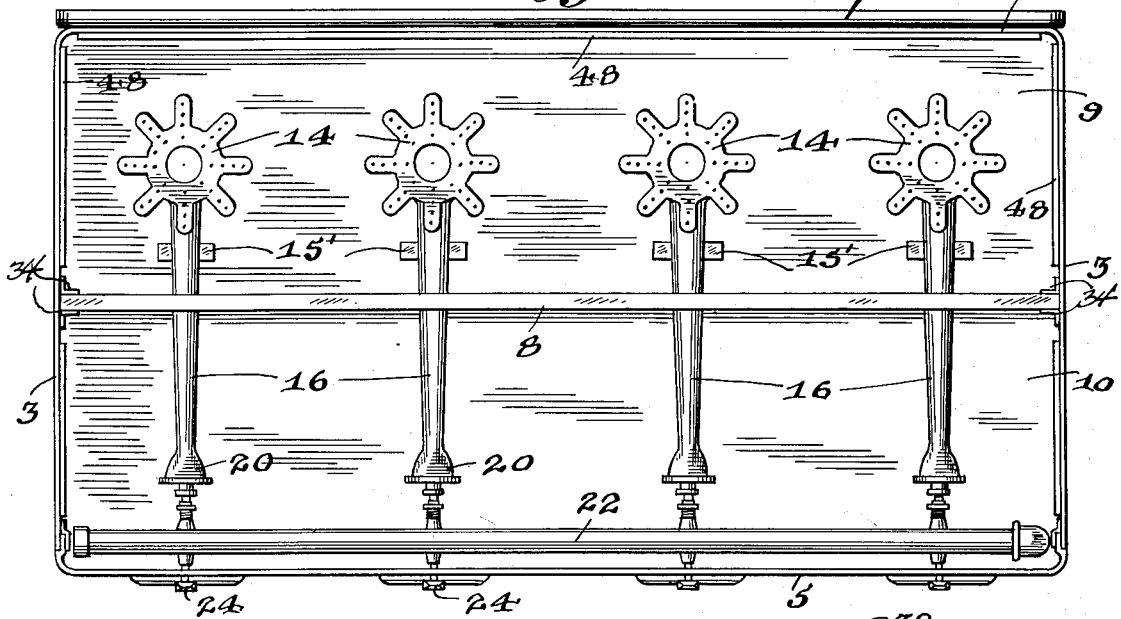
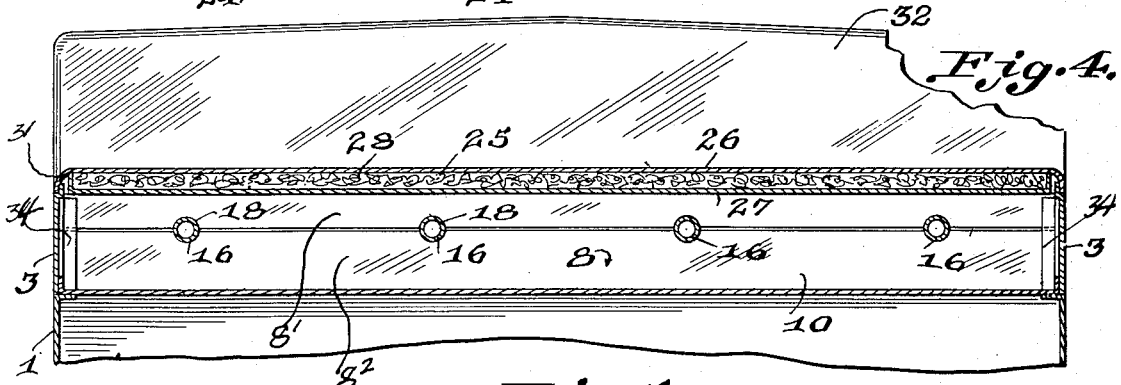
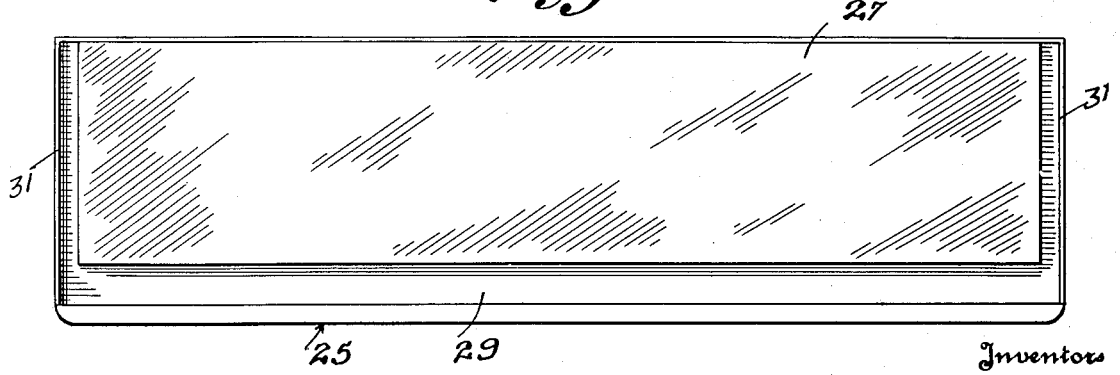
Inventors
Jacob Teller
AND Arthur P. Schulz
By
Attorney

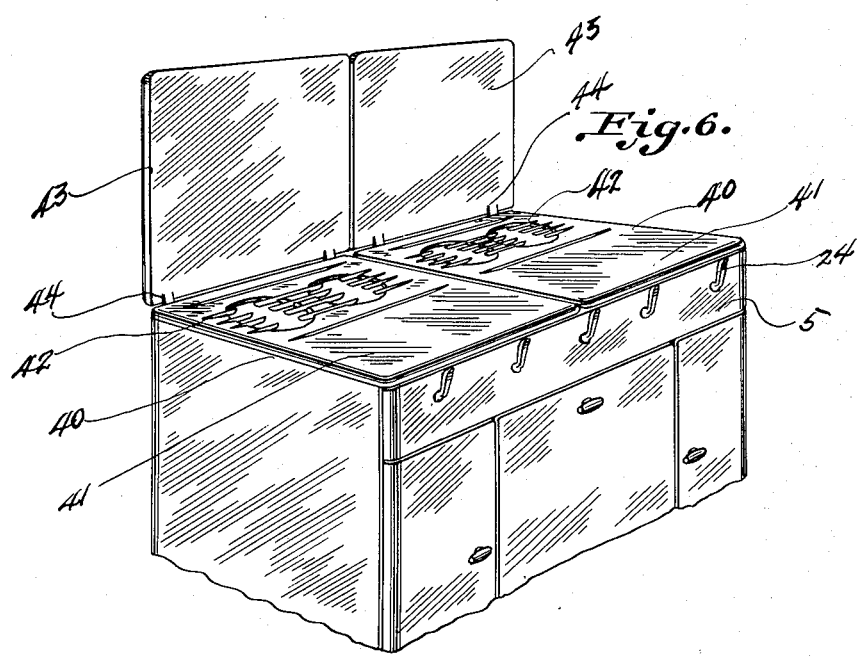
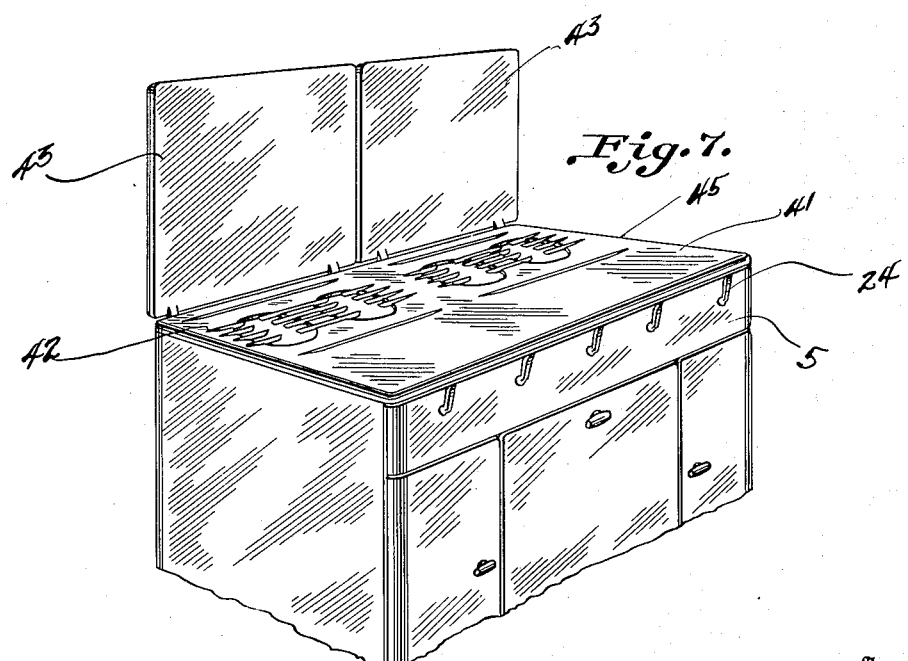

Patented Jan. 2, 1934

1,942,265

UNITED STATES PATENT OFFICE 1,942,265

STRAIGHT-LINE COOKING TOP RANGE OR STOVE

Jacob Teller and Arthur P. Schulz, New York, N. Y., assignors, by mesne assignments, to Teller Stove Designing Corporation, a corporation of New York Application October 23, 1931. Serial No. 570,673

13 Claims. (Cl. 126—214)

This invention relates to gas or electric cooking apparatus, and particularly to a type which we term "straight-line" cooking tops wherein the burners or heaters are arranged in a straight line longitudinally at the rear of the cooking top, while the front or forward portion is utilized for a working space, taking the place of the usual kitchen table or other working support. In other words, this invention is designed to combine in a single unit, a cooking top and table.

In addition to the object and advantages above pointed out, further objects and meritorious features incident to this invention are:—the provision of a cooking top in which the burners are arranged at the rear of a working top surface, whereby the person using the stove may have a space upon which to place the cooking articles and appliances incident to cooking and kitchen operations, which space will naturally be convenient to the burners. The burners being arranged at the rear of the cooking top, and in a straight line, as distinguished from the type in common use today in which certain of the burners are arranged one in front of the other, the danger of the operator catching fire to his or her clothing by reaching over a front lighted burner is entirely eliminated.

A further feature resides in a working top at the front of the stove, which is insulated from the heat of the burners at the rear, to the end that the operator may work on the working top in a relatively cool condition unaffected by the heat of the burners when ignited.

A further particularly advantageous feature resides in the idea of leading the gas conducting pipes and mixers from the burners forwardly and into an insulated chamber or compartment at the front of the stove, whereby these elements are maintained in a cooled condition, being unaffected to any material extent by the heat of the ignited burners.

A further feature resides in arranging the cooking top on a plane substantially coincident with that of the working top, where the cooking utensils may be conveniently slid from one to the other, if necessary.

A still further feature resides in a construction whereby secondary air and primary air for supporting combustion at the burners may be independently supplied, and whereby the primary air may be employed in an additional capacity as means for cooling the working top beneath its upper surface, and for cooling the entire chamber which houses the mixer, manifold, valves and handles.

To recapitulate, the invention proposes a construction in which the controls, such as valves and associated parts, are arranged remotely from the burners; in which the burners are arranged preferably in a straight line at the back of the cooking top, and to the rear of a plane surface working top or table; in which the forward working top and the compartment therebeneath is maintained in a relatively cool condition, unaffected by the heat of the burners, and in which primary and secondary combustion supporting air supply means are provided, the former serving in the additional capacity of a cooling agent for the valves and associated elements.

In the accompanying drawings:

Figure 1 is a top perspective view of the stove embodying our invention;

Figure 2 is a transverse section taken on the line 2—2 of Figure 1;

Figure 3 is a top plan view of the stove with the burner grids and working top removed;

Figure 4 is a longitudinal section on the line 4—4 of Figure 1, looking in the direction of the arrows;

Figure 5 is a top plan view of the under side of the working top;

Figure 6 is a perspective view of the stove showing another form of the cooking top, and Figure 7 is a perspective view of a still further embodiment of the idea of the straight-line cooking top.

Referring now to the drawings by numerals of reference, 1 designates generally the stove, which embodies the cooking top and associated elements, said cooking top comprising a rectangular compartment 2, the side walls 3 and rear wall 4, which are comprised usually of sheet metal enameled plates and form three sides of the compartment, the forward wall taking the form of a sheet metal panel 5, suitably connected at its ends by removable clips or straps 6 to the side walls.

This compartment 2 is divided by a substantially but not necessarily central longitudinal partition 8 of insulating material, such as rockwool or other suitable material, into sub-compartments 9 and 10, the former serving as the burner compartment, while the latter serves as the compartment for the burner extension gas supply pipes and associated elements to be later described, and also for the purpose of supporting the working top.

The sub-compartment 9, which is arranged at the rear of the structure, has an upper rectangular frame 11 for supporting the burner grids 12, mounted over a series of burners 14 arranged in a straight line longitudinally of the stove, said burners being supported from the bottom 15 of the compartment 9 by brackets 15'.

Each of the burners 14 has an extension gas supply pipe or arm 16, which extends through an opening 18 in the longitudinal partition 8, forwardly into the sub-compartment 10, where it terminates in the usual mixing chamber 20. The supply of gas to each of the burners is controlled by a valve 21 carried by the gas manifold 22, the valve stem 23 of each valve extending through an opening in the front panel 5, and having an operating handle 24.

Supported upon the upper edges of the side walls 3 is a removable working top 25 comprising a pair of spaced metallic plates 26 and 27, between which is a packing of asbestos, rock-wool or other suitable insulating material 28. At its ends, the working top is provided with flanges 31, which rest upon and cooperate with said side walls to maintain it in position on the stove, while at its front under edge it is provided with a longitudinal recess 29, which serves to receive the manifold 22. Along its rear edge, the working top may rest upon or closely contact with the upper edge of the longitudinal insulating partition 8 to seal the sub-compartment 10 against the passage of heat from the burners thereinto.

The front panel 5 is provided with a series of groups of openings or louvres 30, preferably arranged so that a group is in proximity to each of the mixers for the purpose of not only supplying primary air to the burners, through the mixers, but also serving to furnish a suitable supply of air to the sub-compartment for keeping it cool. Secondary air for the burners is supplied through openings or louvres 30' in the rear wall of the compartment 2, a group of such air openings being usually arranged adjacent each burner.

It will be observed that the upper surfaces of the working top 25 and the burner grids 11 are in substantially the same plane, whereby cooking utensils may be easily slid from the working top onto the grids or vice versa, which is of great convenience, especially where the utensils are very hot and not readily capable of handling or lifting.

The insulating partition 8 may be suitably mounted in the compartment 2, but we have here shown it as being supported between a pair of vertical flanged strips 34 secured to the end or side walls 3. We have also shown the stove provided with a rear guard or splash plate 32. With reference to Figure 2, it will be seen that each of the burners extends through a central opening in a pan 36, the outer marginal rim of which rests upon a supporting rib 48, suitably secured to the compartment walls.

For convenience in assembling, the partition 8 is longitudinally divided into upper and lower sections 8¹ and 8², along the line of the openings 18 for the gas supply pipes 16.

It is perfectly obvious that the rear guard plate 32, may be hinged so that it may be swung downwardly to cover the burner section. Such an arrangement is shown in Figures 6 and 7 in which the cover plates cover the entire cooking top.

In Figure 6, we have illustrated another form which the cooking top may take, said cooking top being here shown as embodying a pair of plates 40, arranged side by side, and the forward portion of each serving in the capacity of a working table or space, while the rear portion of each is provided with the grids 42. Cover plates 43, individual to each section of the cooking top, are hinged at the rear of the table top plates, as at 44, and may be folded down over the cooking top to cover the same, and thus present a closed cabinet with a smooth top closure.

In Figure 7, the cooking top is formed in a single piece 45, as distinguished from the sectional top of Figure 6. However, like the form shown in Figure 6, the cooking top embodies a forward working table portion 41, and a rear portion containing the grids 42. Now, while we have shown the cover plates 43 formed in sections, it is perfectly obvious that they may be integral, so as to close a unit over the entire cooking top. The remainder of the stove structure in each of the forms of Figures 6 and 7 may be substantially similar to that of the other figures.

It is believed that the invention has been now described sufficiently to enable those skilled in the art to fully understand its construction and operation, and it is to be understood that modifications and changes may be made within the scope of the accompanying claims, without departing from the spirit of the invention.

What we claim as our invention is:—

1. A table top range comprising an upper portion divided along a longitudinal substantially median line into a forward plane top table section and a rear cooking section, a plurality of burners mounted within said rear cooking section and having gas supply pipes extending into said forward section.

2. A table top range comprising an upper compartment having a forward sub-compartment and a rear sub-compartment, means for insulating the two compartments from one another, burners mounted in said rear sub-compartment below the upper plane of said upper compartment, grids supported on said upper compartment in a plane substantially coincident with that of the upper face of said forward sub-compartment, said burners having gas supply pipes extending into said forward sub-compartment, and gas supply control means arranged at the forward portion of said forward sub-compartment.

3. A table top range comprising an upper compartment having a forward sub-compartment and a rear sub-compartment, means for insulating said compartments from one another, burners mounted in said rear sub-compartment below the upper plane of said upper compartment, grids supported on said upper compartment in a plane substantially coincident with that of the upper face of said forward sub-compartment, said burners having gas supply pipes extending into said forward sub-compartment, a gas manifold mounted within said sub-compartment and connected with the several gas burner supply pipes, and gas supply control means arranged at the forward portion of said forward sub-compartment.

4. A range comprising an upper compartment longitudinally divided into a front section having insulated rear and top walls, and a rear section, heating elements mounted within said rear section, means operatively supplying said heating elements extending into said front section, and means arranged toward the front of said front section for controlling the said first named means.

5. A table top range comprising an upper compartment having an insulated front longitudinal plane top movable cover and a rear burner section, and burners arranged within said rear burner section.

6. A range comprising a compartment having a rear upwardly open sub-compartment, burners arranged within said rear compartment, and a forward sub-compartment insulated from said rear sub-compartment, and having a plane insulated top cover plate.

7. A range comprising an upper portion divided along a longitudinal median line into a rear gas burner containing chamber and a forward insulated chamber, having an insulated removable cover plate.

8. A range comprising an upper portion divided along a longitudinal median line into a rear gas burner containing chamber and a forward insulated chamber, and means for supplying air to each of said chambers.

9. A range comprising an upper compartment divided along a longitudinal median line into a rear gas burner containing chamber and a forward insulated chamber, primary air supply means for said gas burners at the forward portion of said forward chamber and a secondary air supply means at the rear portion of said rear chamber 10. A stove structure comprising a section having a front and rear compartment, burners arranged within the rear compartment and having supply pipes extending into the front compartment, a gas manifold and valves arranged at the front of said front compartment, means for separating the front from the rear compartment, and a removable working top supported by said front compartment.

11. A stove structure comprising a section having a front and a rear compartment, burners mounted within said rear compartment, a working top plate mounted upon the front compartment, and grids mounted upon said rear compartment, the upper surfaces of said grids and working top plate being in substantially the same horizontal plane, and said plate being insulated below its top face.

12. A stove structure comprising a section having a front compartment and a rear compartment, burners mounted in said rear section, gas supply and control means at the front of said front section, and an insulated working top carried by said front compartment.

13. A stove structure comprising a section having a rear compartment and a front compartment, an insulating partition extending longitudinally through said section to insulate one section from the other, burners within said rear section, an insulating working top covering said front section, and burner supply and control means carried by said front section.

JACOB TELLER.
ARTHUR P. SCHULZ.